United States Patent
Hassan et al.

(10) Patent No.: US 12,009,937 B2
(45) Date of Patent: Jun. 11, 2024

(54) QUEUE MANAGEMENT FOR VISUAL INTERRUPTION SYMBOLS IN A VIRTUAL MEETING

(71) Applicant: MICROSOFT TECHNOLOGY LICENSING, LLC, Redmond, WA (US)

(72) Inventors: Amer Hassan, Kirkland, WA (US); Mahendra Sekaran, Sammamish, WA (US); Scott Edward Van Vliet, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 501 days.

(21) Appl. No.: 17/145,104

(22) Filed: Jan. 8, 2021

(65) Prior Publication Data
US 2022/0224554 A1 Jul. 14, 2022

(51) Int. Cl.
*H04L 12/18* (2006.01)
*G06F 3/04842* (2022.01)
*H04L 49/90* (2022.01)

(52) U.S. Cl.
CPC ...... *H04L 12/1818* (2013.01); *G06F 3/04842* (2013.01); *H04L 49/90* (2013.01)

(58) Field of Classification Search
CPC . H04L 12/1818; H04L 12/1827; H04L 49/90; G06F 3/04842
USPC .......................................................... 709/206
See application file for complete search history.

(56) References Cited

U.S. PATENT DOCUMENTS

| | | | |
|---|---|---|---|
| 9,148,627 B2 | 9/2015 | Anderson et al. |
| 9,215,543 B2 | 12/2015 | Winsvold et al. |
| 9,674,244 B2 | 6/2017 | Katzman et al. |
| 2002/0085029 A1 | 7/2002 | Ko et al. |
| 2010/0131866 A1 | 5/2010 | Nielsen et al. |
| 2011/0117886 A1 | 5/2011 | Travis et al. |
| 2014/0229866 A1 | 8/2014 | Gottlieb |

(Continued)

FOREIGN PATENT DOCUMENTS

WO 2018102007 A1 6/2018

OTHER PUBLICATIONS

"ConferenceManager Participant's Guide Software Version 12.0", Retrieved from: http://compunetix.com/ix/assets/pdfs/sonexis/Participant_Guide.pdf, Retrieved Date: Oct. 15, 2020, 20 Pages.

(Continued)

*Primary Examiner* — Meng Vang
(74) *Attorney, Agent, or Firm* — NovoTechIP International PLLC

(57) ABSTRACT

A system and method for identifying the next speaker from multiple meeting participants requesting to speak in a virtual meeting and persistently displaying a visual interruption symbol for the next speaker is disclosed. The system is configured to maintain a display of the visual interruption symbol along with a visual representation of the next speaker at a position of each meeting interface associated with meeting participants while changing displays of other visual representations of other participants at other positions of each meeting interface. The system is also configured to suppress displays of other visual interruption symbols from other participants of the virtual meeting.

20 Claims, 12 Drawing Sheets

(56) References Cited

U.S. PATENT DOCUMENTS

| | | | | |
|---|---|---|---|---|
| 2015/0288925 A1* | 10/2015 | Hwang | ............... | H04L 65/1066 348/14.09 |
| 2016/0088259 A1* | 3/2016 | Anderson | ............... | H04N 7/157 348/14.03 |
| 2016/0255126 A1* | 9/2016 | Sarris | ................. | H04L 65/1096 348/14.08 |
| 2017/0093933 A1* | 3/2017 | Bader-Natal | .......... | H04L 65/403 |
| 2019/0341050 A1 | 11/2019 | Diamant et al. | | |
| 2019/0379752 A1* | 12/2019 | Digilov | ................... | H04L 67/54 |
| 2021/0409465 A1* | 12/2021 | Garrett | ................... | G10L 15/30 |

OTHER PUBLICATIONS

"Facilitating Student Participation on Zoom", Retrieved from: http://cteresources.bc.edu/documentation/zoom/facilitate-participation-zoom/, Retrieved Date: Oct. 15, 2020, 13 Pages.

"Manage meeting attendees in Adobe Connect", Retrieved from: https://helpx.adobe.com/adobe-connect/using/attendees.html, Retrieved Date: Sep. 1, 2020, 15 Pages.

"Raise your hand in a Teams meeting", Retrieved from: https://support.microsoft.com/en-us/office/raise-your-hand-in-a-teams-meeting-bb2dd8e1-e6bd-43a6-85cf-30822667b372, Retrieved Date: Sep. 1, 2020, 4 Pages.

"View Meeting Participants with Their Hand Raised in Cisco Webex Meetings and Events", Retrieved from: https://help.webex.com/en-us/nivey11/View-Meeting-Participants-with-Their-Hand-Raised-in-Cisco-Webex-Meetings-and-Events, Sep. 15, 2020, 3 Pages.

Birmann, Ricardo, "Grid View and Raise Hand", Retrieved from: https://support.google.com/meet/thread/35345566?hl=en, Mar. 25, 2020, 3 Pages.

John, Steven, "How to use the 'raise hand' feature in Zoom on a computer or mobile device", Retrieved from: https://www.businessinsider.com/how-to-raise-hand-in-zoom?IR=T#:~:text=During%20a%20meeting%2C%20click%20on,button%20labeled%20%22Raise%20Hand.%22&text=Your%20digital%20hand%20is%20now%20raised., Mar. 17, 2020, 14 Pages.

McKearin, Cheryl, "How do I use the Raise Hand feature in Webex?", Retrieved from: https://answers.uillinois.edu/uic/page.php?id=99309, Mar. 23, 2020, 2 Pages.

Schmidt, Philipp J., "A few simple tips for better online meetings (COVID-19 edition)", Retrieved from: https://www.media.mit.edu/posts/a-few-simple-tips-for-better-online-meetings-covid-19-edition/, Mar. 7, 2020, 10 Pages.

"International Search Report and Written Opinion Issued in PCT Application No. PCT/US21/057561", dated Feb. 10, 2022, 12 Pages.

* cited by examiner

QUEUE MANAGEMENT FOR VISUAL INTERRUPTION SYMBOLS IN A VIRTUAL MEETING

TECHNICAL FIELD

The present disclosure relates to systems and methods for automatically adapting meeting interfaces of an application providing a virtual meeting in response to identifying the next speaker from multiple meeting participants requesting to speak in the virtual meeting, and persistently displaying a visual interruption symbol for that next speaker.

BACKGROUND

Virtual conferencing/meeting allows two or more people at multiple places to communicate with each other through video, audio, and text transmissions in an online meeting, which is particularly useful when a face-to-face meeting is unavailable or burdensome. To avoid interruption of another's presentation in a virtual meeting, an attendee/participant can raise a hand to indicate his/her desire to speak. Sometimes multiple participants may raise their hands to request speaking at approximately the same time, but only one participant can take the floor to talk at a certain time. Current virtual meeting systems can categorize and order meeting participants requesting, and highlight each participant in the category for displaying to participants. However, displaying each requesting participant as the current virtual meeting is underway tends to create sensory distractions. When user interactions such as sharing, chatting, talking occur in the virtual meeting while a participant is waiting to talk, a "raised hand" indication for this participant can easily be hidden in the interactions and thus be ignored. To timely identify and notify the next speaker to take over the meeting floor and talk, a meeting organizer may have to keep track of the "raised hand" indications, thereby impairing user experience. Another technical problem is that, when a requesting participant uses an electronic device with a small screen (e.g., a smartphone) to join the virtual meeting, the display of multiple "raised hand" indications may not fit in the small screen, and the requesting participant would miss his/her turn to talk unless he/she scrolls down the view to see all the "raised hand" indications.

Hence, there is a need for a system and method for queuing meeting participants requesting to speak in a virtual meeting and persistently highlighting one or more meeting participants in the next position(s) of the queue.

SUMMARY

In one aspect, a raising-hand queue management system for automatically adapting meeting interfaces of an application providing a virtual meeting in response to receiving interruption signals includes a processor, and a memory, coupled to the processor, configured to store executable instructions. The instructions, when executed by the processor, cause the processor to receive a plurality of interruption signals, from meeting interfaces of the application providing the virtual meeting, wherein the meeting interfaces are among a set of meeting interfaces associated with the application providing the virtual meeting on a respective set of client devices for a respective set of participants of the virtual meeting; based on a criterion associated with the virtual meeting: determine an order for surfacing the interruption signals: and identify, from the interruption signals, a first subset of interruption signals associated with a first subset of participants, wherein the first subset of interruption signals includes one or more of the received interruption signals but less than a total number of the received interruption signals; responsive to identifying the first subset of interruption signals, send a first interruption symbol raising signal over a communication network to each meeting interface of the set of meeting interfaces, the interruption symbol raising signal being configured to turn on a first subset of visual interruption symbols associated with the first subset of participants for displaying on each meeting interface, wherein the displayed first subset of visual interruption symbols includes one or more visual interruption symbols but less than a total number of the received interruption signals.

The instructions, when executed by the processor, also cause the processor to, responsive to detecting an interruption symbol lowering signal to turn off one of the first subset of visual interruption symbols associated with one of the first subset of participants on each meeting interface: update each meeting interface to turn off the one of the first subset of visual interruption symbols associated with the one of the first subset of participants; subsequent to turning off the one of the first subset of visual interruption symbols, automatically identify a next interruption signal for surfacing from the plurality of interruption signals other than the first subset of interruption signals according to the determined order; and send a next interruption symbol raising signal corresponding to the next interruption signal over the communication network to each meeting interface of the set of meeting interfaces to turn on a next visual interruption symbol associated with a next participant for displaying on each meeting interface.

In another aspect, a method of automatically adapting meeting interfaces of an application providing a virtual meeting in response to receiving interruption signals includes: receiving a plurality of interruption signals, from meeting interfaces of the application providing the virtual meeting, wherein the meeting interfaces are among a set of meeting interfaces associated with the application providing the virtual meeting on a respective set of client devices for a respective set of participants of the virtual meeting; based on a criterion associated with the virtual meeting: determining an order for surfacing the interruption signals, and identifying, from the interruption signals, a first subset of interruption signals associated with a first subset of participants, wherein the first subset of interruption signals includes one or more of the received interruption signals but less than a total number of the received interruption signals; responsive to identifying the first subset of interruption signals, sending a first interruption symbol raising signal over a communication network to each meeting interface of the set of meeting interfaces, the interruption symbol raising signal being configured to turn on a first subset of visual interruption symbols associated with the first subset of participants for displaying on each meeting interface, wherein the displayed first subset of visual interruption symbols includes one or more visual interruption symbols but less than a total number of the received interruption signals.

The method also includes, responsive to detecting an interruption symbol lowering signal to turn off one of the first subset of visual interruption symbols associated with one of the first subset of participants on each meeting interface: updating each meeting interface to turn off the one of the first subset of visual interruption symbols associated with the one of the first subset of participants; subsequent to turning off the one of the first subset of visual interruption symbols, automatically identifying a next interruption signal for surfacing from the plurality of interruption signals other than the first subset of interruption signals according to the determined order; and sending a next interruption symbol raising signal corresponding to the next interruption signal over the communication network to each meeting interface of the set of meeting interfaces to turn on a next visual interruption symbol associated with a next participant for displaying on each meeting interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
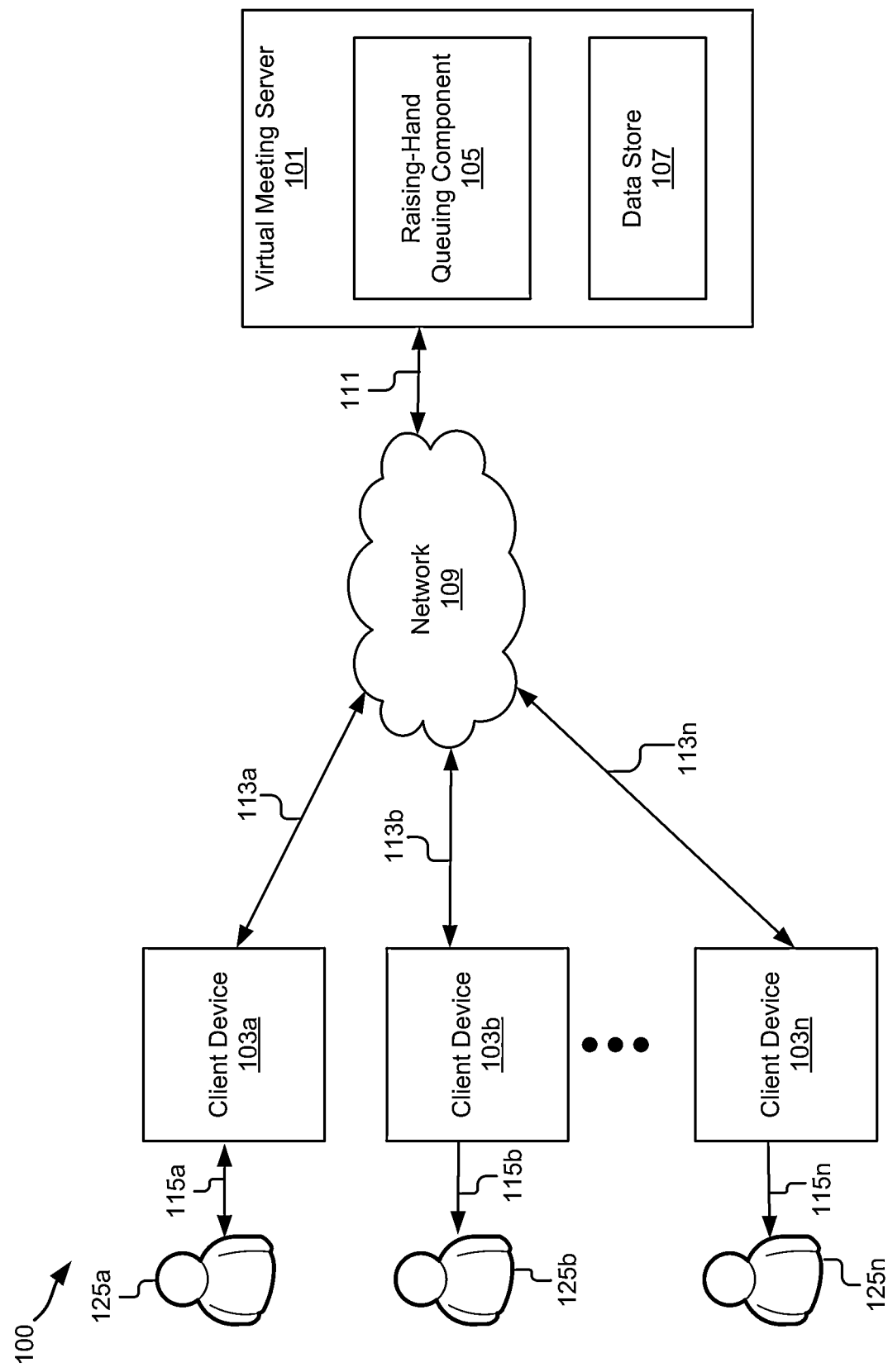
FIG. 1 is a block diagram of an example raising-hand queue management system.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

When multiple meeting participants request speaking in a virtual meeting and only one participant can speak at a time, the existing virtual meeting systems categorize these requesting participants and turn on a visual interruption symbol for each participant in the category so that the participants displayed with the visual interruption symbols can speak in an order. The visual interruption symbol represents each participant's request to contribute to the virtual meeting. In one specific example, the visual interruption symbol corresponds to a raised hand symbol in Microsoft Teams® or Zoom® application. A technical problem herein is that the display of visual interruption symbols for each requesting participant may be unfocused by other interactions, thereby causing participants to spend extra time and resources on tracking the next participant to talk. For example, while a first requesting participant is waiting for his/her turn to speak in a meeting, other participants may be talking verbally, chatting with textual messages, transmitting files, sharing whiteboards, i.e., acting actively. Usually, these active participants and active interactions will appear in the main views of meeting interfaces associated with each meeting participant. This can easily occupy the relatively inactive display of the visual interruption symbol of the first requesting participant. The first participant needs to find a way to see the hidden display of the visual interruption symbol and speak at an appropriate time. Even if the display of the visual interruption symbols does not become inattentive/distracted by other interactions (e.g., in a virtual class where students merely ask questions), there is still another technical problem. An electronic device used for joining the virtual meeting has a limited display space, which may be insufficient to display every visual interruption symbol with every requesting participant. Therefore, it is very likely that the participant(s) in a lower order or priority may not know at what time he/she should talk unless he/she navigates to another view or menu of the meeting interface to obtain such information.

To address the above technical problems, the technical solution described in the present application persistently displays a visual interruption symbol only for the participant that is next in queue to speak and deliberately suppresses the display of other visual interruption symbols for other requesting participants until it is their turn to speak in the meeting. In one implementation, the technical solution includes server(s) and client devices. The server(s) may receive multiple interruption signals from multiple participants via multiple meeting interfaces associated with multiple client devices for requesting permission to speak in a virtual meeting. Upon receiving the multiple interruption signals, the server(s) may identify a first interruption signal received from a first participant based on a criterion associated with the virtual meeting, and send a first interruption symbol raising signal to each client device to turn on a first visual interruption symbol from the first participant for persistently displaying on each meeting interface. The first visual interruption symbol may be a raised hand symbol indicating that the first participant raises a virtual hand in the meeting via a first meeting interface.

By persistently displaying the first visual interruption symbol, the technical solution maintains a display of the first visual interruption symbol along with a visual representation of the first participant at a position of the meeting interfaces of meeting participants while changing displays of visual representations of other participants at other positions of the meeting interfaces. In other words, regardless of the frequent/continuous display changes of other participants with active interactions, the next participant in the queue, i.e., the next speaker, will stay in the upfront view of the meeting interfaces until this participant is no longer the next speaker, that is, he/she has started talking or has completed talking. By displaying only the first visual interruption symbol, the technical solution suppresses displays of other visual interruption symbols from other requesting participants. Therefore, one glance at the meeting interface would allow every meeting participant to know who the next speaker is. Accordingly, the technical benefits of the technical solution described herein include saving computing resources such as processing time, bandwidth, etc., otherwise spent on searching and finding the next speaker in the line. Especially when participants use small screen devices for joining the meeting, no navigation to layers of views/menus is needed, which significantly improves user experience.

The technical solution queues the received multiple interruption signals based on a criterion associated with the virtual meeting. The criterion includes at least one of timestamps associated with the interruption signals, user roles associated with participants of the virtual meeting, relevancy of the participants to the virtual meeting, organizer preferences, and other meeting policies associated with the virtual meeting. For example, the technical solution may recognize an important meeting participant and include a persistent visual representation for this important participant in the meeting interface when he/she signals to talk instead of queuing this participant based on the time of arrival. Therefore, important messages from the important participant can always be delivered in the limited time duration of the virtual meeting. In another example, if a participant frequently raises his/her hand and interrupts the meeting, the technical solution may move this participant towards the end of the queue such that the limited bandwidth and resource would be balanced to other participants. Therefore, ordering the requesting participants based on different factors relating to the virtual meeting and meeting participants improves the efficiency and effectiveness of the virtual meeting, thereby reducing the cost of computing resources used in the virtual meeting.

FIG. 1 is a block diagram of an example raising-hand queue management system 100. As shown, the system 100 includes a virtual meeting server 101 and one or more client devices 103a-103n coupled for electronic communication via a network 109. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of virtual meeting servers 101, client devices 103a-103n, or networks 109.

The network 109 may be a conventional type, wired and/or wireless, and may have numerous different configurations including a star configuration, token ring configuration, or other configurations. For instance, the network 109 may include one or more local area networks (LAN), wide area networks (WAN) (e.g., the Internet), public networks, private networks, virtual networks, mesh networks, peer-to-peer networks, and/or other interconnected data paths across which multiple devices may communicate. The network 109 may also be coupled to or include portions of a telecommunications network for sending data in a variety of different communication protocols. In one implementation, the network 109 includes Bluetooth® communication networks or a cellular communications network for sending and receiving data including via short messaging service (SMS), multimedia messaging service (MMS), hypertext transfer protocol (HTTP), direct data connection, WAP, email, etc.

The client devices 103a-103n (or collectively client device 103) may include virtual or physical computer processors, memor(ies), communication interface(s)/device(s), etc., which, along with other components of the client device 103, are coupled to the network 109 via signal lines 113a-113n for communication with other entities of the system 100. In one implementation, the client device 103a-103n, accessed by users 125a-125n via signal lines 115a-115n respectively, may send and receive data to and from other client device(s) 103 and/or the virtual meeting server 101, and may further analyze and process the data. For example, the client devices 103a-103n may communicate with the virtual meeting server 101 to generate and update a meeting interface for display on each of the client devices 103a-103n. Non-limiting examples of client device 103 may include a laptop computer, a desktop computer, a tablet computer, a mobile telephone, a personal digital assistant (PDA), a mobile email device, or any other electronic devices capable of processing information and accessing the network 109.

The virtual meeting server 101 is a computing device that communicates with one or more client devices 103 to host an online virtual meeting and to process the data exchanged with the one or more client devices 103. In one implementation, the virtual meeting server 101 receives a request from the user 125a (e.g., a meeting organizer) via the client device 103a to establish a virtual space for an online meeting. The virtual meeting server 101 supports chat service, calling service, and other services so that multiple participants can hear, see, chat, and share data with each other in the virtual space. The virtual meeting server 101 may also track and analyze the communication messages/signals used in the virtual meeting to instruct one or more client devices 103 to automatically update the meeting interfaces with information of turning on/off a visual interruption symbol for a next speaker and switching to display another visual interruption symbol for a subsequent next speaker. In one implementation, the virtual meeting server 101 may include a server-side application to communicate with client-side applications residing on the client devices 103, and to provide the virtual meeting to participants via meeting interfaces. The application may be Microsoft Teams® application, Zoom® application, etc. The virtual meeting server 101 is communicatively coupled to the network 109 via signal line 111.

As depicted, the virtual meeting server 101 includes a raising-hand queuing component 105. In one implementation, the raising-hand queuing component 105 receives multiple interruption signals from multiple participants who want to talk in a virtual meeting. Instead of showing multiple requesting participants altogether on each meeting interface, the raising-hand queuing component 105 may display the requesting participants one by one based on a queue that orders the multiple requesting participants. For example, the raising-hand queuing component 105 may identify a first interruption signal from a first participant (e.g., the next speaker in the queue) and turn on only a first visual interruption symbol (e.g., a raised hand symbol) from the first participant on each meeting interface. This first visual interruption symbol will be persistent in the display of each meeting interface until the raising-hand queuing component 105 detects an interruption symbol lowering signal to turn off the first visual interruption symbol, e.g., after the first participant starts to talk or has completed talking in the meeting. Responsive to detecting the interruption symbol lowering signal, the raising-hand queuing component 105 may retrieve a next interruption signal associated with a next participant from the queue of the multiple interruption signals and turn on a visual interruption symbol from the next participant for persistently displaying on each meeting interface. The raising-hand queuing component 105 will be described in more detail below with reference to FIG. 2.

Although only one raising-hand queuing component 105 is depicted in FIG. 1, it is possible that one or more instances of raising-hand queuing component 105 also reside on the one or more client devices 103. For example, an instance of the raising-hand queuing component 105 may be part of the serve-side application providing the virtual meeting on the virtual meeting server 101 while other instances of the raising-hand queuing component 105 may be included in corresponding client-side applications installed on the client devices 103a-103n. Each instance may be configured to perform certain functionalities depending on where the instance resides. In one implementation, the virtual meeting server 101 may be a cloud server that possesses larger computing capabilities and computing resources than the client device 103a, and therefore may perform more complex computation than the client device 103a can. In the present disclosure, the raising-hand queuing component 105 mainly prioritizes the interruption signals collected from different meeting participants in a queue and performs subsequent operations based on the queue, which is typically implemented by the virtual server 101. While the raising-hand queuing component 105 on the client side may perform some operations such as detecting, receiving, and sending signals that support the main functionalities performed at the server side, for simplicity and clarity, FIG. 1 does not include the instances of raising-hand queuing component 105 on the client side. The description below will be based on the system structure depicted in FIG. 1.

In one implementation, the virtual meeting server 101 also includes a data store 107. The data store 107 stores data related to different types of signals such as interruption signals, interruption symbol raising signals, interruption symbol lower signals, and acoustic signals. The data may include timestamps of signals (e.g., when a hand was raised), source of the signals (e.g., from which meeting interface the signal was sent), intensity levels of signals, etc. The data store 107 also stores any other information related to the operations described herein, such as interactions occurring during the time that a next participant is waiting for talk, information of participants requesting to speak, user roles of the participants, etc.

Figure 2:
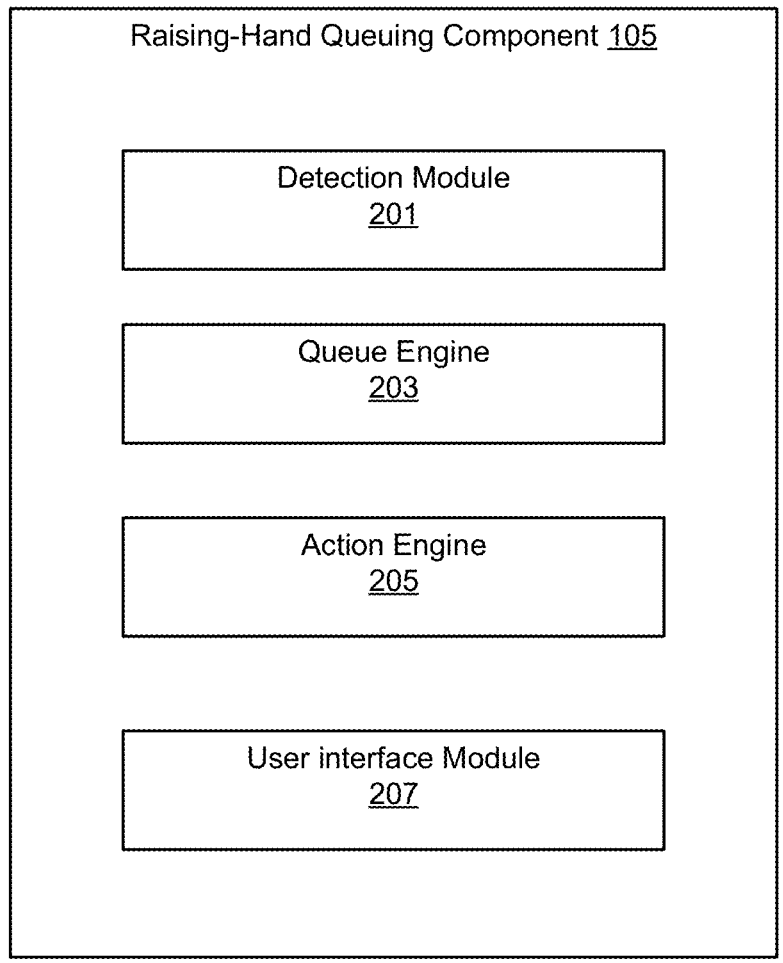
FIG. 2 is a block diagram of example components of a raising-hand queuing component.

FIG. 2 is a block diagram of example components of a raising-hand queuing component 105. The raising-hand queuing component 105 includes hardware and/or software logic for receiving multiple interruption signals representing multiple participants' requests to contribute to a virtual meeting, identifying, from the multiple participants, a small subset of participant(s) that will contribute/speak next in the meeting, and displaying only a visual interruption symbol for this identified participant(s) on each participant's meeting interface. By not displaying every visual interruption symbol for every requesting participant, the raising-hand queuing component 105 reduces the amount of signals/data exchanged between the client devices 103 and the virtual meeting server 101, thereby improving user navigation experience and increasing operational efficiency.

In one implementation, the raising-hand queuing component 105 includes a detection module 201, a queue engine 203, an action engine 205, and a user interface module 207. The detection module 201 receives multiple interruption signals from multiple participants of a virtual meeting and, in response, transmits the received interruption signals along with associated metadata to notify the queue engine 203 to identify a predetermined number of interruption signal(s). The multiple interruption signals represent the multiple participants' requests to speak in the virtual meeting. The predetermined number of interruption signal(s) are associated with a predetermined number of participant(s) who will speak next in the meeting since the multiple participants cannot speak simultaneously in the meeting. The identification of the predetermined number of interruption signal(s) will be described below in more detail with reference to the queue engine 203.

Figure 5A:
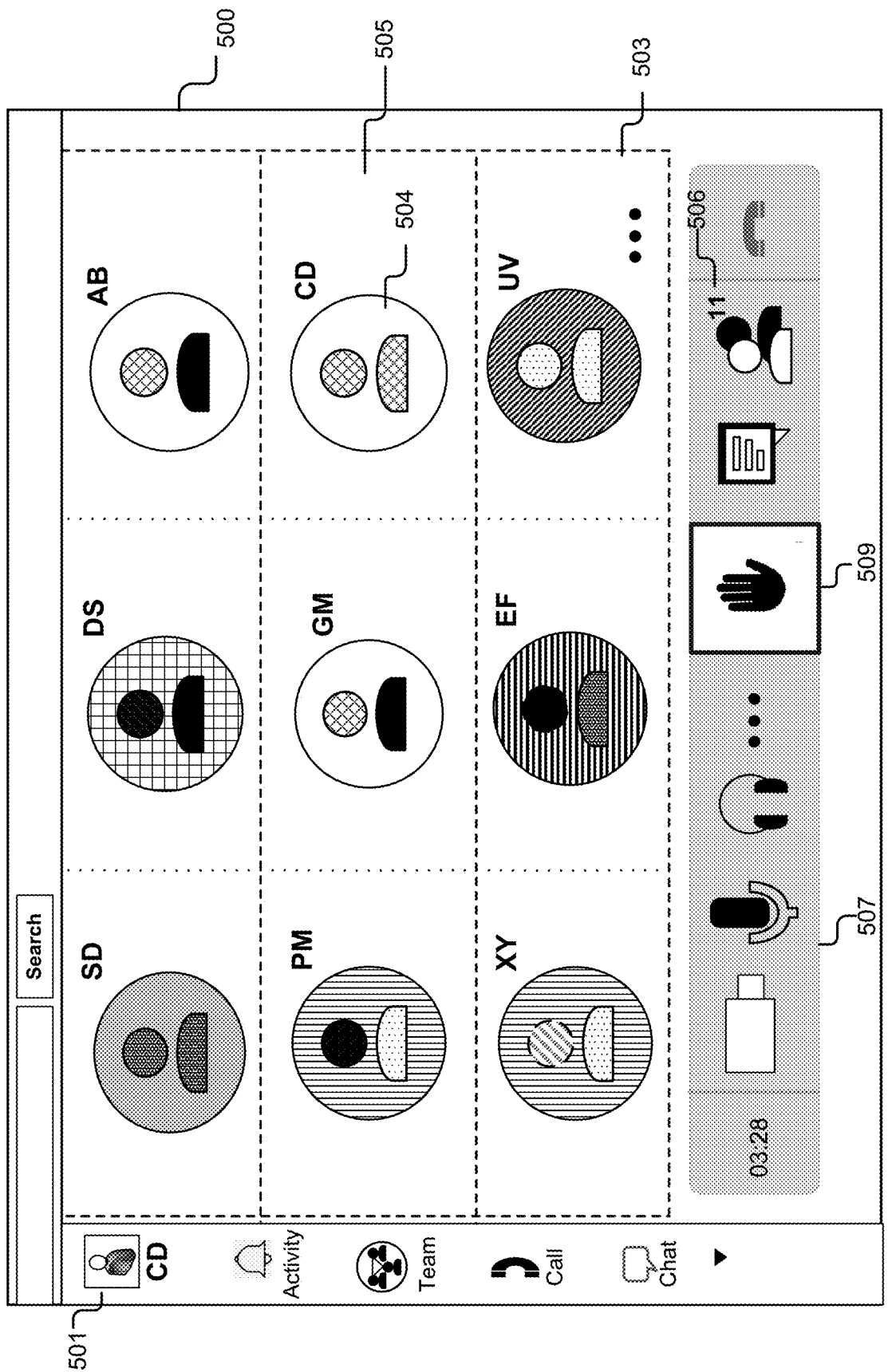
FIG. 5A is an example graphical user interface presenting a "Raise Hand" option.

In one implementation, the multiple participants may send the multiple interruption signals via multiple meeting interfaces to request to speak in the meeting without interrupting the meeting. The multiple meeting interfaces are among a set of meeting interfaces associated with the virtual meeting that are displayed on the client devices 103 for each meeting participant. For example, one participant may signal that he/she wishes to speak or contribute to the meeting by selecting/tapping/touching a "Raise Hand" option included in a meeting interface as depicted in FIG. 5A. In one implementation, each interruption signal is associated with a timestamp. The timestamp shows the time that the one participant requested permission to speak. In another implementation, each interruption signal is also associated with other metadata such as a source, times of the interruption signal was received from the source within a certain period of time, etc. The detection module 201 may send the received interruption signals associated with the metadata to the queue engine 203 for identifying the predetermined number of interruption signal(s) or a first subset of interruption signals.

Figure 5B:
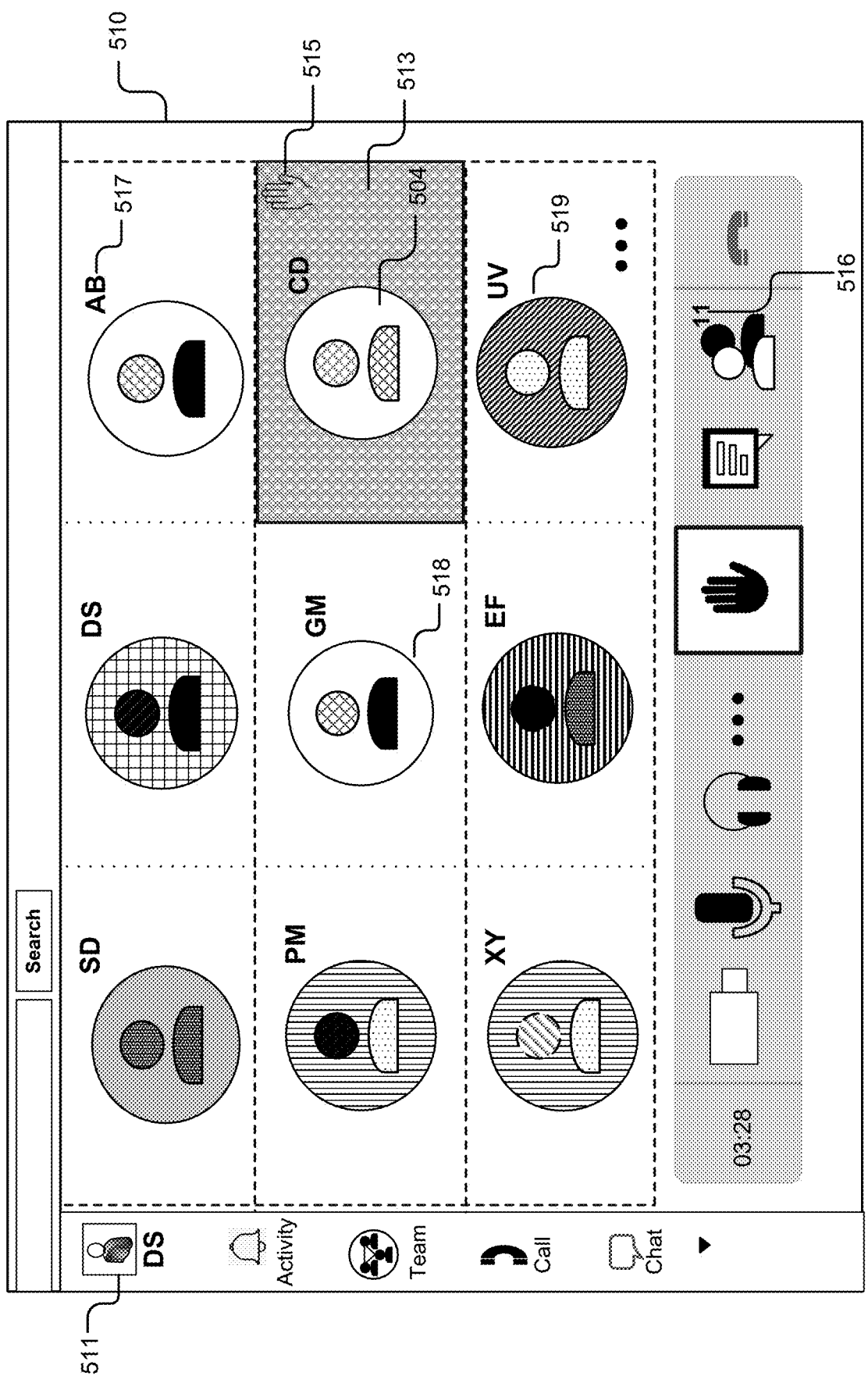
FIG. 5B illustrates an example graphical user interface displaying the next speaker.

Once receiving the identified predetermined number of interruption signal(s) or the first subset of interruption signals, e.g., a first interruption signal from a first participant that will talk next in the meeting, the detection module 201 may generate and send a first interruption symbol raising signal over a communication network (e.g., the network 109) to each of the client devices 103 to turn on a first visual interruption symbol from the first participant for persistently displaying on each meeting interface. It should be noted a first signal, first symbol or first participant may be more often used in the below description, these terms could also mean first subset of signals, symbols, or participants. The first visual interruption symbol for the first participant will maintain an "on" status, i.e., visible to every participant, until the first participant is no longer a next speaker. A visual interruption symbol may be an icon, a flag, a button, or other types of graphical symbol that identifies a unique "raised hand" status, that is, the first participant is requesting permission to speak or contribute. For example, the visual interruption symbol is a raised hand symbol as depicted in FIG. 5B.

After the transmission of the first interruption symbol raising signal, the detection module 201 detects whether there is an interruption symbol lowering signal from the first participant. The interruption symbol lowering signal indicates that the first participant is talking or has completed talking, and thus is no longer a next speaker. In one implementation, the detection module 201 may detect the interruption symbol lowering signal for turning off the first visual interruption symbol responsive to receiving a user operation from at least one of the first participant or a meeting organizer. For example, after selecting a "Raise Hand" option to trigger the first visual interruption symbol to appear in the meeting interface, the first participant can select this option again to make the symbol disappear. In another example, the meeting organizer may have control to turn off the first visual interruption symbol by selecting a different interface element.

However, user operations are unpredictable. In the case that both the first participant and meeting organizer fail to timely turn off or lower down the first visual interruption symbol, in one implementation, the detection module 201 may notify the queue engine 203 to identify the next speaker for persistently display. In the meantime, the detection module 201 may also communicate with the action engine 205 to turn off the symbol for the first participant. In another implementation, after a threshold amount of time has passed without receiving the user operation, the detection module 201 may enable a prompt to be generated to the first participant. The prompt reminds the first participant to lower down the first visual interruption symbol/hand within a second threshold amount of time. If still no user operation is timely received, the detection module 201 again notifies the action engine 205 to turn off the hand for the first participant.

In another implementation, the detection module 201 may automatically generate the interruption symbol lowering signal responsive to detecting an acoustic signal from the first participant. The acoustic signal includes a voice of the first participant indicating that he/she has started talking for a threshold amount of time (e.g., five seconds) or has completed talking in the virtual meeting. For example, the detection module 201 may communicate with a recognition engine (not shown) to identify the voice of the first participant based on the intensity level of the voice, the specific client device (e.g., client device 103a) that the first participant uses for accessing the virtual meeting, etc.

If the detection module 201 detects the interruption symbol lowering signal from the first participant, it will trigger the first visual interruption symbol from the first participant to be turned off on each meeting interface. More importantly, responsive to detecting this interruption symbol lowering signal, the module(s)/engine(s) of the raising-hand queuing component 105 may cooperate with each other to start a new cycle for identifying the next participant who should talk after the first participant and displaying a new/next visual interruption symbol corresponding to this next participant on each meeting interface associated with the meeting participants. In other words, the next participant will replace the first participant for displaying persistently.

The queue engine 203 receives the multiple interruption signals and associated metadata from the detection module 201, and identifies a predetermined number of interruption signals from the participant(s) who will speak next in the virtual meeting. The predetermined number is an integer less than the number of the multiple signals/participants. Typically, the predetermined number is one. In one implementation, a participant (e.g., a meeting organizer) may configure the predetermined number via a meeting interface. This number is usually kept small (e.g., one or two) such that the limited display space of meeting interfaces associated with the client device 103 will not be crowded by highlighted participants and thus lose the meaningful highlight of a next speaker. In the description hereafter, the predetermined number will be considered as one unless specified otherwise.

In one implementation, the queue engine 203 may configure and manage a queue of the multiple interruption signals received from the detection module 201. The queue engine 203 may prioritize the multiple interruption signals in the queue according to a criterion and identify the interruption signal from a next speaker, i.e., "next speaker signal," based on the queue. For example, the queue engine 203 may identify the interruption signal at the beginning or the first position of the queue as the next speaker signal. The criterion may include at least one of timestamps associated with the multiple interruption signals, user roles associated with participants of the virtual meeting, relevancy of the participants to the virtual meeting, organizer preferences, or any combination thereof.

In one implementation, the queue engine 203 may manage the queue based on timestamps associated with the multiple interruption signals (i.e., timestamp criterion). A timestamp indicates the time that a corresponding signal was received. In such a case, the queue engine 203 implements the queue as a first-in-first-out (FIFO) queue in which an interruption signal with a most recent timestamp, i.e., the latest signal, is placed at the end or last position of the queue. The queue engine 203 may also identify the interruption signal that entered the queue at the earliest time as the next speaker signal.

In one implementation, the queue engine 203 may also manage the queue based on user roles associated with participants of the virtual meeting (i.e., user role criterion). A user role may include a job role, a meeting role, etc. A job role is the function that a meeting participant fills within a corporation, such as a chief executive officer (CEO), a department manager, an engineer, etc. In one implementation, the queue engine 203 may query a corporation directory to obtain the job role of each meeting participant and apply a policy criterion relating to job roles to the ordering of the queue. For example, if a CEO raises his/her hand in the virtual meeting, the queue engine 203 may place the corresponding interruption signal in the beginning of the queue even if another meeting participant has raised hand before the CEO. This queue arrangement can guarantee that the interruption signal from the CEO is the next speaker signal and the CEO is the next speaker, and thus assure that important messages from participants with important job roles be delivered.

On the other hand, the meeting role of a participant may include an organizer, a presenter, an audience, etc. The queue engine 203 also orders the queue using the meeting roles. In one implementation, the queue engine 203 may associate/create an interruption signal to the meeting organizer and leave a position of the queue to this organizer interruption signal such that the meeting organizer can take over the floor to speak in the meeting when needed. For example, when a participant starts to talk in the meeting and the queue of interruption signals is empty (i.e., no other participants are waiting to talk), the queue engine 203 may move the organizer interruption signal towards the top of the queue so that the meeting organizer can host the meeting after the current participant finishes talking. In another example of a classroom meeting where a professor is a presenter, the queue engine 203 may arrange the queue in a way that the professor is always the next speaker when he/she wants to talk in the class.

In one implementation, the queue engine 203 may also manage the queue based on relevancy of the participants to the virtual meeting (i.e., relevancy criterion). The queue engine 203 may determine the relevancy based on a user role of the participant and/or the characteristics of the meeting. The meeting characteristics may include type, subject, content, scheduled time of the meeting, scheduled conference room of the meeting, etc. For example, the queue engine 203 may determine that a department manager is more relevant to a department meeting of his/her department than an executive officer who oversees every department meeting. Accordingly, when both the department manager and executive officer intent to talk in the meeting, the queue engine 203 may assign a position closer to the beginning of the queue to the interruption signal of the department manager rather than to the interruption signal of the executive officer. In another example, for a patent disclosure meeting, the queue engine 203 may determine that a patent counsel's opinion is critical and thus assign a higher priority to the counsel over other meeting participants.

The queue engine 203 is also configured to adjust the relevancy determination and adjust the order of signals in the queue accordingly. For example, based on the scheduled time or agenda of the meeting, the queue engine 203 may determine that the virtual meeting will discuss a first department during a first time period and discuss a second department during a second time period. Responsive to receiving the requests to speak from first and second department managers at the first and second time periods, the queue engine 203 may prioritize the first department manager over the second department manager during the first time period while prioritizing the second department manager over the first department manager during the second time period. In another example, if a virtual class is moved from a first classroom to a second classroom (e.g., a simulated courtroom), the queue engine 203 may modify the queue of interruption signals because the professor is the meeting presenter in the first classroom while the students are presenters in the second classroom.

In one implementation, the queue engine 203 may also manage the queue based on organizer preferences (i.e., organizer criterion). In this scenario, the next speaker identified by the meeting organizer will be moved to the beginning of the queue. The meeting organizer may set up his/her preference rules or select a next speaker from a list of requesting participants via a configuration interface as depicted in FIG. 5F. For example, if a participant raised his/her hand more than a threshold number of times during a specific time period (e.g., more than two times within 10 minutes), the queue engine 203 may move the position of the interruption signal associated with this participant to the end of the queue according to the organizer preferences. This can prevent a few audiences from repeatedly raising their hands and distracting the presenter. In another example, the queue engine 203 may allow the meeting organizer to select a participant who barely talked in the meeting but eventually raised his/her hand as the next speaker.

It should be noted that the queue engine 203 may further manage the queue based on other meeting policies associated with the virtual meeting. For example, the queue engine 203 may cooperate with the action engine 205 and the user interface module 207 to display at least two persistent images: one for the next speaker, and another for the CEO. Therefore, whenever the CEO wants to talk, he/she can talk in the meeting right after the current speaker is done talking. According to a different corporate policy, however, the queue engine 203 may determine that the CEO's hand-raising does not supersede another participant's hand-rising if they are in a casual meeting discussing, for example, where to picnic.

As described above, due to the application of the criterion such as user role criterion, relevancy criterion, or organizer criterion, the queue is not necessarily a FIFO queue determined based on the time of arrivals of the interruption signals. In such a case, there will be a queue delay for some participants. For example, the participant(s) who raised hand(s) and triggered interruption signal(s) before the CEO raised his/her hand will be delayed because the queue engine 203 moves the CEO to the first position of the queue according to the user role criterion. In one implementation, the queue engine 203 may set up a delay cap policy to include a maximum amount of time or a maximum number of times that can be delayed. Therefore, after identifying an interruption signal as a next interruption signal by overriding the timestamp criterion and applying a different criterion, the queue engine 203 will determine the other interruption signal, i.e., the overridden signal, as a next interruption signal before a threshold amount of time elapses or threshold numbers of delay runs out. In other words, a deferred participant will be able to talk within a maximum time or number of delays. This inclusive cap policy allows each participant's activity to be considered and conducted, thereby improving user experience in the virtual meeting.

The queue engine 203 arranges the queue of the multiple interruption signals received from the detection module 201 in an order determined based on a criterion, which corresponds to an ordered set of participants scheduled to speak in a virtual meeting. In one implementation, the queue engine 203 may identify a predetermined number of interruption signals from a predetermined number of positions in the beginning of the queue, and correspond each of the identified interruption signals to a specific participant. The position of an interruption signal in the queue reflects the order that the corresponding participant will talk in the meeting. For example, if only one interruption signal is identified, the corresponding participant would be the next speaker. If two interruption signals in the first and second positions are identified, the participant corresponding to the signal in the first position will talk and then the participant corresponding to the signal in the second position will talk. The predetermined number is usually one or two.

In one implementation, the queue engine 203 may transmit information of the identified participant(s), e.g., the next speaker or the speaker subsequent to the next speaker, to the action engine 205 for further processing. The queue engine 203 may then remove the identified predetermined number of interruption signals from the queue and re-order the queue. The queue engine 203 may also store the information of the queue in the data store 107.

Responsive to receiving the information of identified participant(s) from the queue engine 203, the action engine 205 may send an interruption symbol raising signal to each meeting interface to turn on a visual interruption symbol from the identified participant(s) (e.g., the first participant) for persistently displaying on each meeting interface associated with meeting participants. In one implementation, the action engine 205 may instruct the interface module 207 to display a persistent image for the first participant on each meeting interface. The persistent image includes the visual interruption symbol (e.g., a "raised hand" symbol) posed on a visual representation of the first participant (e.g., a picture, an avatar). In contrast, other un-identified participants are only displayed on each meeting interface with corresponding visual representations. In the cases where more than one participant, e.g., the first participant (the next speaker) and a second participant (the next speaker after the first participant), are identified, the action engine 205 may also include a number that reflects the speaking order of the first and second participants in each persistent image. In other cases, the action engine 205 may also change the color, shape, or frame of the persistent image to distinguish the first participant from other requesting participant(s), i.e., awaiting speaker(s), and non-requesting meeting participants on each meeting interface. A person with ordinary skill may recognize there are other ways to display the next speaker(s) differently from other participants.

The action engine 205 operates to display the identified next speaker(s), i.e., the first participant, in a persistent way. In one implementation, the action engine 205 maintains a display of the visual interruption symbol along with the visual representation of the first participant at a position of the meeting interface while changing the displays of other visual representations of other participants at other positions of the meeting interface. For example, a meeting interface may include a specified number (e.g., nine) of grids or tiles. Each grid includes a visual representation of a participant. When more than the specified number of participants are in the meeting, only visual representations of partial participants will be displayed in the grids. The first participant may or may not be included in the grids. However, when the first participant is identified as the next speaker, the action engine 205 will include the persistent image of the first participant in one of the grids. This persistent image, in particular, the visual interruption symbol or the "raised hand" symbol associated with the visual representation of the first participant, will stay at that position of the grids until the first participant is no longer the next speaker. The first participant becomes a current or past speaker after the first participant starts talking or has completed talking in the meeting. Once the visual interruption signal of the first participant disappears, the visual interruption signal of the next participant after the first participant will show up if the queue of interruption signal is not empty. During the time period that the action engine 205 keeps the persistent image of the first participant unchanged in that position, the display of other grids can be freely changed. For example, two participants that are actively exchanging chat messages may appear in the grids to replace two other inactive participants. Therefore, regardless of the interactions among other participants and consequent display changes of other visual representations of other participants, the visual representation and visual interruption symbol of the first participant remains untouched in a position of the meeting interface. The position may be any position of the grid view, not necessarily the center position.

When displaying the persistent image of the first participant, the action engine 205 also suppresses displays of other visual interruption symbols from other participants of the virtual meeting. The action engine 205 extracts a predetermined number of next speaker(s) based on the queue of interruption signals and highlights only the extracted speakers on the meeting interface. The action engine 205 does not distinguish other requesting participants in the display although these participants are waiting to speak in an order indicated by corresponding positions in the queue of interruption signals. Therefore, the action engine 205 does not need to give the participant associated with the beginning position/index of the queue, i.e., the next speaker or the first participant, the center of attention by placing the first participant in a central grid of the meeting interface. The next speaker(s) stand out when only one or two of the participants are highlighted and highlighted persistently.

In one implementation, the action engine 205 may turn off/lower down the visual interruption symbol by the first participant after the first participant has contributed to the meeting and is no longer a next speaker. In one implementation, the action engine 205 automatically generates an interruption symbol lowering signal and sends the interruption symbol lowering signal to each of the client devices 103 such that the client devices 103 can automatically update the display of each meeting interface and turn off the visual interruption symbol. For example, the action engine 205 may automatically remove a "raised hand" flag or icon of the first participant from a position of the grid of each meeting interface associated with meeting participants as a result of turning off the visual interruption symbol. In another implementation, the action engine 205 receives an interruption symbol lowering signal from the detection module 201 and notifies the client devices 103 to lower down the visual interruption symbol associated with the first participant.

In one implementation, the action engine 205 may automatically turn off the visual interruption symbol or lower the first participant's hand in two scenarios: (1) after detecting that the first participant starts talking or (2) after detecting that the first participant stops talking. In the first scenario, the action engine 205 may generate the interruption symbol lowering signal to lower the "raised hand" after a specific amount of time (e.g., five seconds) of receiving the acoustic signal including the first participant's voice. Therefore, the first participant's hand may be lowered when he/she is still talking. In the second scenario, the action engine 205 may determine the received acoustic signal no longer include the voice from the first participant and turn off the visual interruption signal. In other words, the action engine 205 lowers the first participant's hand after he/she has done talking in the meeting. In another implementation, the action engine 205 may turn off the visual interruption symbol of the first participant when the first participant or the meeting organizer acts to manually lower the hand. Once the visual interruption symbol of the first participant is turned off, the action engine 205 cooperates with other module(s) and/or engine(s) of the raising-hand queuing component 105 to identify the next speaker after the first participant for persistently display. The overall procedure for identifying and displaying a next speaker will be described below with reference to FIGS. 3 and 4.

In one implementation, if the first participant or the meeting organizer fails to timely lower down the hand of the first participant, the action engine 205 may cooperate with the user interface module 207 to generate a prompt to remind the first participant to lower down the hand so that another cycle of identifying a next speaker can start. The action engine 205 may also communicate with the user interface module 207 to provide, on the first meeting interface, the first participant an option to configure whether to manually or automatically lower his/her hand. The action engine 205 may further instruct the user interface module 207 to generate other notifications, for example, allow a meeting organizer to select a value of the predetermined number to control how many "next speakers" can be concurrently displayed on the meeting interface.

The user interface module 207 receives instruction(s) from the action engine 205 to send graphical data to the client device 103, causing the client device 103 to present a user interface to a user or a participant. Example user interfaces are shown in FIGS. 5A-5G. In one implementation, the user interface module 207 generates the graphical data for providing a user interface that presents a selectable "Raise Hand" option to a participant or displays a visual interruption symbol for the participant once the participant selects the "Raise Hand" option. In another implementation, the user interface module 207 may generate a notification or a prompt for display on the meeting interface associated with one or more users. In yet another implementation, the user interface module 207 may generate a meeting interface that allows a participant to provide input for configuring specific functionalities. The user interface module 207 may generate graphical data for providing other user interfaces to meeting participants.

Figure 3:
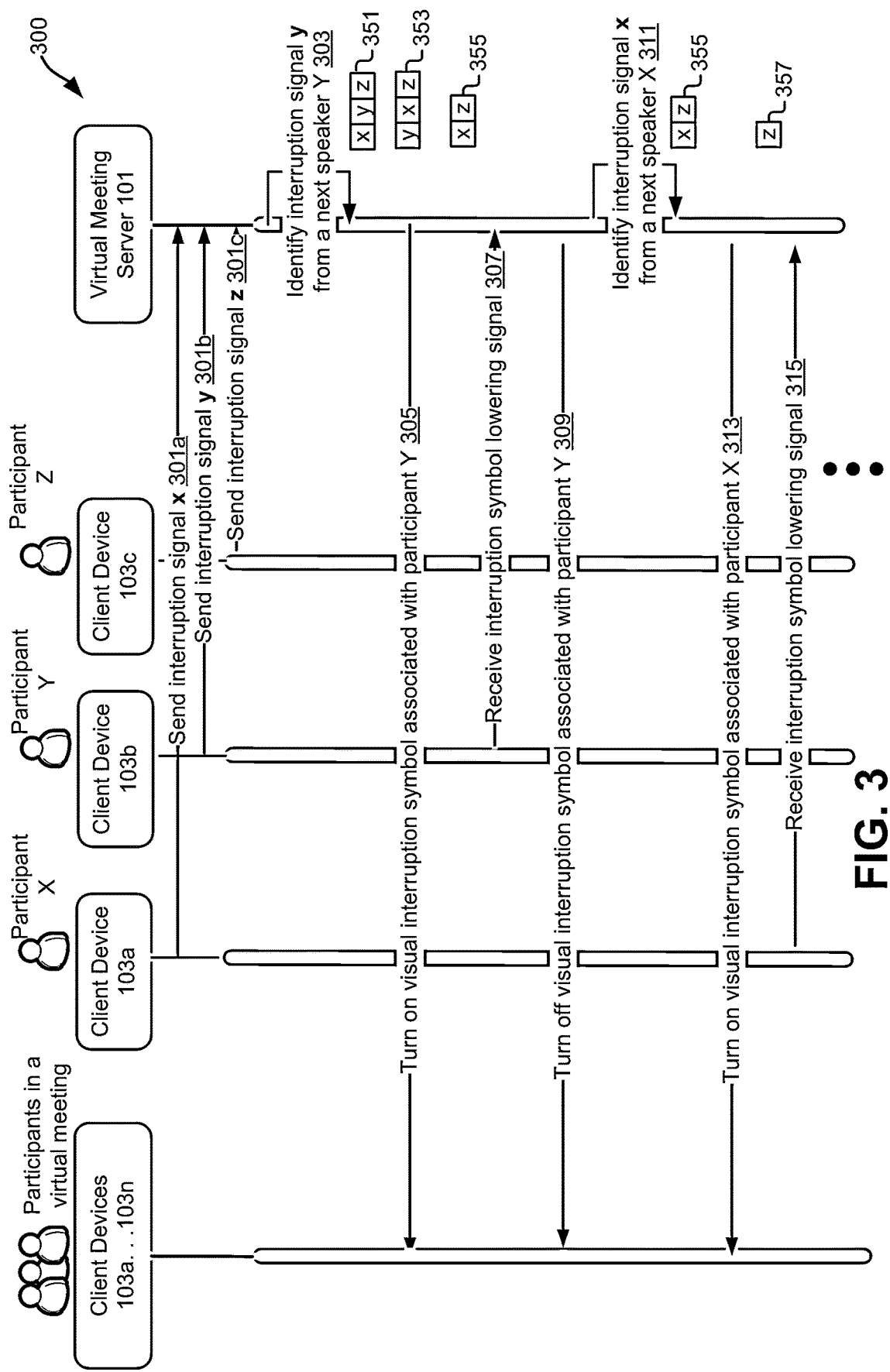
FIG. 3 is a block diagram of an overall procedure of identifying and displaying the next speaker from multiple meeting participants requesting to speak in a virtual meeting.

FIG. 3 is a block diagram of an example procedure of identifying and displaying a next speaker from multiple meeting participants requesting to speak in a virtual meeting. A set of participants including participants X, Y, and Z use the client devices 103*a*-103*n* to join the virtual meeting. The three participants X, Y, and Z are also separately depicted in the middle of FIG. 3 to explain the overall queuing and display process. At the approximate same time, each of the participants X, Y, and Z respectively selects a "Raise Hand" option via a meeting interface respectively displayed on the client device 103*a*, 103*b* and 103*c*. X's selection triggers an interruption signal x to be sent at 301*a* to a virtual meeting server 101. Y's selection triggers an interruption signal y to be sent at 301*b* to the virtual meeting server 101. Z's selection triggers an interruption signal z to be sent at 301*c* to the virtual meeting server 101. These signals indicate that X, Y, and Z are requesting permission to speak in the meeting.

The virtual meeting server 101 creates a queue to include the three interruption signals x, y, and z. The virtual meeting server 101 may use the queue of signals x, y, and z, which are respectively received from participants X, Y, and Z, to identify which of X, Y, and Z is a next speaker. Depending on the different criteria used for arranging the signals in the queue, the queue can be different. For example, if the virtual meeting server 101 uses timestamps associated with the three signals as the criterion, the signals will be ordered as in the first queue 351. However, if the virtual meeting server 101 uses another criterion such as the user role criterion to form the queue, the signals will be ordered as in the second queue 353. Although X is the first participant requesting to speak, Y, is an important participant that prioritizes over X when the user role criterion is applied. Therefore, in the second queue 353, signal y from participant Y is in the first position while signal x from participant X is in the second position. In other words, the next speaker will be X if the first queue 351 is used while the next speaker will be Y if the second queue 353 is used. Suppose the virtual meeting server 101 applies the user role criterion to queue the signals, the result would be identifying interruption signal y from a next speaker Y at 303.

Responsive to the identification of interruption signal y, at 305, the virtual meeting server 101 communicates with each client device 103 to update the meeting interface associated with each participant in the virtual meeting and turn on a visual interruption symbol associated with Y on each meeting interface. Although three participants X, Y, and Z have requested to speak, only speaker Y is identified as the next speaker and is highlighted with the visual interruption symbol to every meeting participant.

Once Y is displayed as the next speaker, the virtual meeting server 101 may remove the corresponding signal y from the queue 353. As a result, the queue 353 is changed to queue 355. The queue 355 includes only signals x and z, where the positions of x and z indicate that the next speaker after Y is X. In the meantime, Y is waiting for his/her turn to talk. If Y starts to talk in the meeting (e.g., for a threshold amount of time) or has completed talking, Y may manually lower down his/her raised hand, or a meeting organizer may manually lower down the raised hand for Y, or the virtual meeting server 101 may automatically lower down the raised hand for Y. This causes an interruption symbol lowering signal to be generated and sent to the virtual meeting server 101 at 307.

Responsive to receiving the interruption symbol lowering signal, at 309, the virtual meeting server 101 communicates with each client device 103 to update the meeting interface associated with each participant in the virtual meeting and turn off the visual interruption symbol associated with Y on each meeting interface. It should be noted that during the entire time that Y was identified as a next speaker until Y was no longer the next speaker, Y's visual interruption symbol is persistently displayed to every meeting participant no matter how many changes affected the display of other participants.

The virtual meeting server 101 now starts a new cycle to find a next speaker from the rest of the requesting participants. At 311, based on the queue 355, the virtual meeting server 101 identifies the interruption signal x from a next speaker X. Then, at 313, the virtual meeting server 101 communicates with the client device 103 to update each meeting interface to turn on a visual interruption symbol associated with X on each meeting interface. With the display of the next speaker X to every meeting participant, the queue 355 becomes the queue 357. The queue 357 includes only signal z indicating that the last speaker or the next speaker after X is Z. At 315, the virtual meeting server 101 receives the interruption symbol lowering signal from X to release X's persistent display. As a result, the virtual meeting server 101 may cooperate with the client device 103 to start another cycle to let Z take the floor to talk in the meeting. The steps performed in this cycle are similar and thus skipped in FIG. 3.

Figure 4:
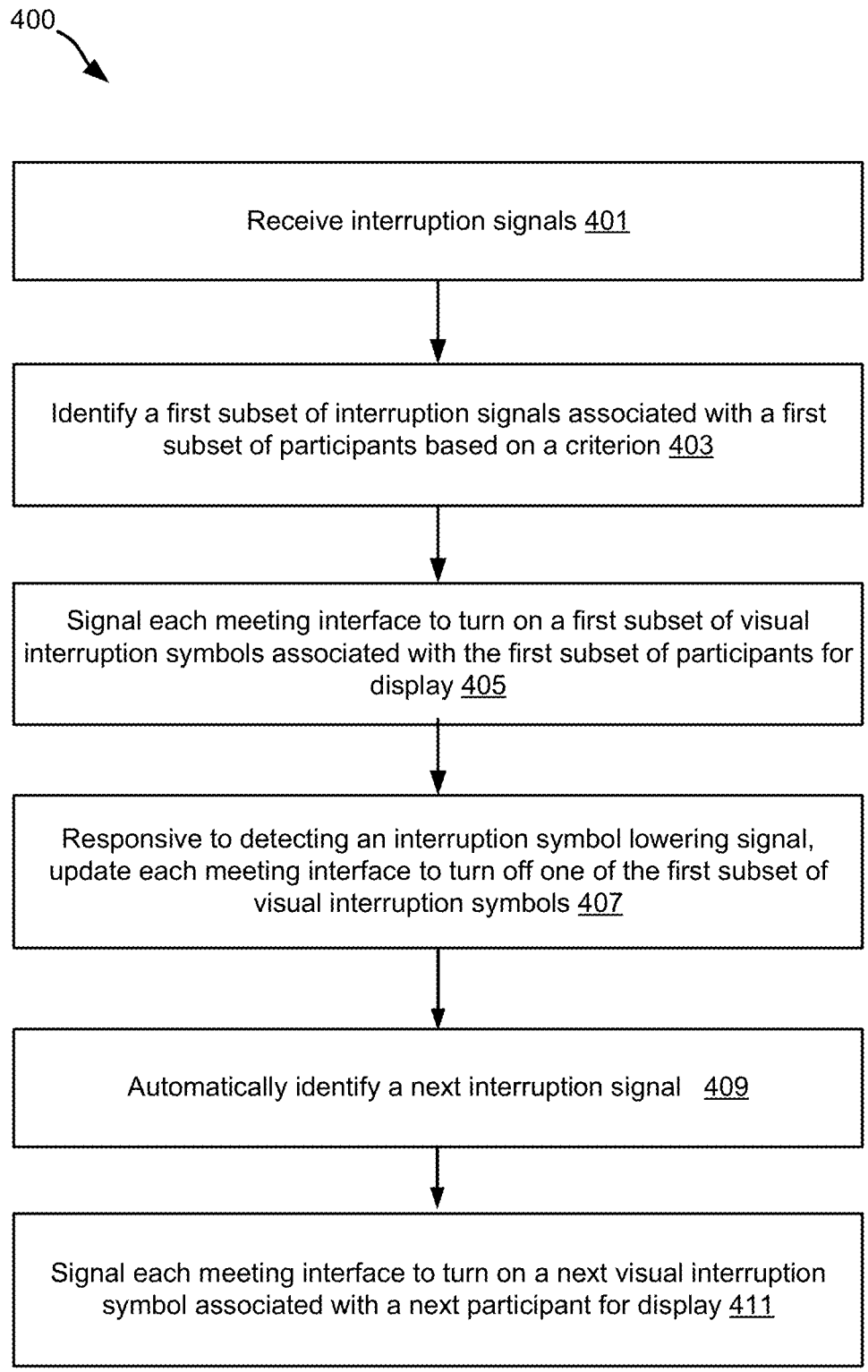
FIG. 4 is a flowchart of an example method for automatically adapting meeting interfaces of an application providing a virtual meeting in response to receiving interruption signals.

FIG. 4 is a flowchart of an example method 400 for automatically adapting meeting interfaces of an application providing a virtual meeting in response to receiving interruption signals by a raising-hand queuing component 105 of the virtual meeting server 101. At block 401, the raising-hand queuing component 105 receives multiple interruption signals, from multiple meeting interfaces of the application providing the virtual meeting. An interruption signal represents a participant's intention/request to contribute to the virtual meeting. The multiple meeting interfaces are among a set of meeting interfaces associated with the application providing the virtual meeting on a respective set of client devices for a respective set of participants of the virtual meeting.

At block 403, based on a criterion associated with the virtual meeting, the raising-hand queuing component 105 identifies, from the multiple interruption signals, a first subset of interruption signals associated with a first subset of participants. For example, the raising-hand queuing component 105 may determine an order for surfacing the interruption signals based on the criterion and identify a first subset of interruption signals based on the order. The first subset of interruption signals includes one or more of the received interruption signals or (e.g., a predetermined number of interruption signals) but less than a total number of the received interruption signals. A predetermined number is a small number like one or two. When this number is one, a single next speaker, e.g., the first participant, is identified. When this number is two, two speakers in the first and second positions of the queue are identified. The criterion may include at least one of timestamps associated with the multiple interruption signals, user roles associated with participants of the virtual meeting, relevancy of the participants to the virtual meeting, organizer preferences, other meeting policies associated with the virtual meeting, or any combination thereof.

At block 405, responsive to identifying the first subset of interruption signals, the raising-hand queuing component 105 sends a first interruption symbol raising signal over a communication network to each meeting interface of the set of meeting interfaces. The interruption symbol raising signal is configured to turn on a first subset of visual interruption symbols associated with the first subset of participants for displaying on each meeting interface. The displayed first subset of visual interruption symbols includes one or more visual interruption symbols but less than a total number of the received interruption signals. The visual interruption symbol may be an icon, a flag, a button, or other types of graphical symbol that identifies a unique "raised hand" status, that is, the first participant is requesting permission to speak. The display may be persistent, that is, the raising-hand queuing component 105 may maintain a display of each of the first subset of visual interruption symbols along with a visual representation of a corresponding participant of the first subset of participants at a position of each meeting interface while changing displays of one or more visual representations of one or more other participants at one or more other positions of each meeting interface. The persistent display also means that the raising-hand queuing component 105 may suppress displays of other visual interruption symbols associated with other participants of the virtual meeting.

Responsive to detecting an interruption symbol lowering signal to turn off one of the first subset of visual interruption symbols associated with one of the first subset of participants on each meeting interface, at block 407, the raising-hand queuing component 105 updates each meeting interface to turn off the one of the first subset of visual interruption symbols associated with the one of the first subset of participants. Once this first visual interruption symbol is turned off or lowered down, a next speaker needs to be surfaced to show on the display. At block 409, subsequent to turning off the one of the first subset of visual interruption symbols, the raising-hand queuing component 105 automatically identifies a next interruption signal for surfacing from the plurality of interruption signals other than the first subset of interruption signals. At block 411, the raising-hand queuing component 105 sends a next interruption symbol raising signal corresponding to the next interruption signal over the communication network to each meeting interface of the set of meeting interfaces to turn on a next visual interruption symbol associated with a next participant for displaying on each meeting interface. The identification of the next participant is according to the order determined by queuing the interruption signals based on the criterion as described in block 403.

FIG. 5A illustrates an example graphical user interface 500 presenting a "Raise Hand" option. The user interface 500 is a meeting interface associated with an online virtual meeting that is displayed for a specific meeting participant (i.e., user CD at 501). The meeting interface 500 includes an area 503 for displaying visual representations of participants. As depicted, area 503 includes nine grids, and a visual representation 504 of user CD is displayed in grid 505. The virtual meeting has a total number of 11 participants as shown in 505, where only nine participants are displayed in area 503 due to the limited spaces. In addition to the number indicator 506, an action bar 507 also includes a time indicator showing the progress of the virtual meeting and other options, for example, a "Raise Hand" option in 509. Multiple meeting attendees or participants, who intend to speak, can simply click the "Raise Hand" option 509 to raise a virtual hand.

FIG. 5B illustrates an example graphical user interface 510 displaying a next speaker. User CD is one of the multiple participants who selected the "Raise Hand" option shown in FIG. 5A. Based on an ordered queue, CD is identified as the next speaker. The user interface 510 is the meeting interface of user DS 511, which shows that CD is highlighted with a persistent image. The persistent image of CD in grid 513 includes the visual representation 504 and a visual interruption symbol 515. The visual interruption symbol 515 shows that CD has raised a virtual hand and the persistent image of CD shows that CD is the next speaker in the queue. At this first time point, there are still 11 participants in the meeting as shown in 516. The visual representations 517, 518, and 519 around the persistent image of CD respectively represent users AB, GM, and UV.

Figure 5C:
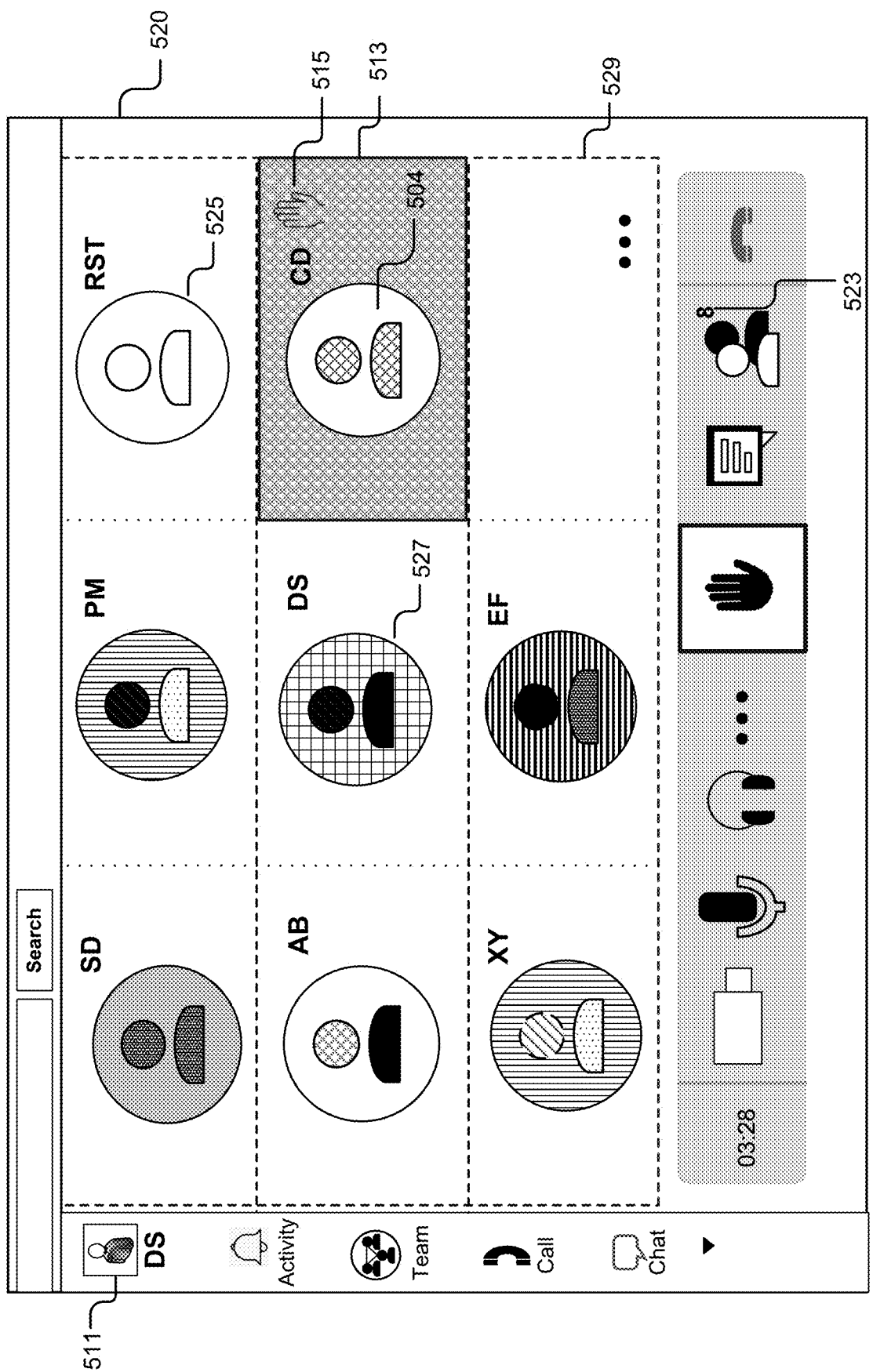
FIG. 5C illustrates an example graphical user interface showing the persistent display of the next speaker in FIG. 5B.

FIG. 5C illustrates an example graphical user interface 520 showing the persistent display of the next speaker in FIG. 5B. The user interface 520 is the meeting interface of user DS 511 at a second time point after the first time point of FIG. 5B. At the second time point, CD still has not got permission to talk, and therefore, the display of CD is persistent in grid 513. Neither the visual representation 504 nor the visual interruption symbol 515 are changed. However, the meeting participants drop from 11 to 8 as shown in 523. Therefore, only eight visual representations are shown in nine grids, which leaves the previously represented user UV in 529 to become blank. Also, the participant represented in grid 525 is changed from AB to RST, and the participant represented in grid 527 is changed from GM to DS. Compared FIGS. 5B and 5C, CD is displayed persistently as long as CD is still the next speaker.

Figure 5D:
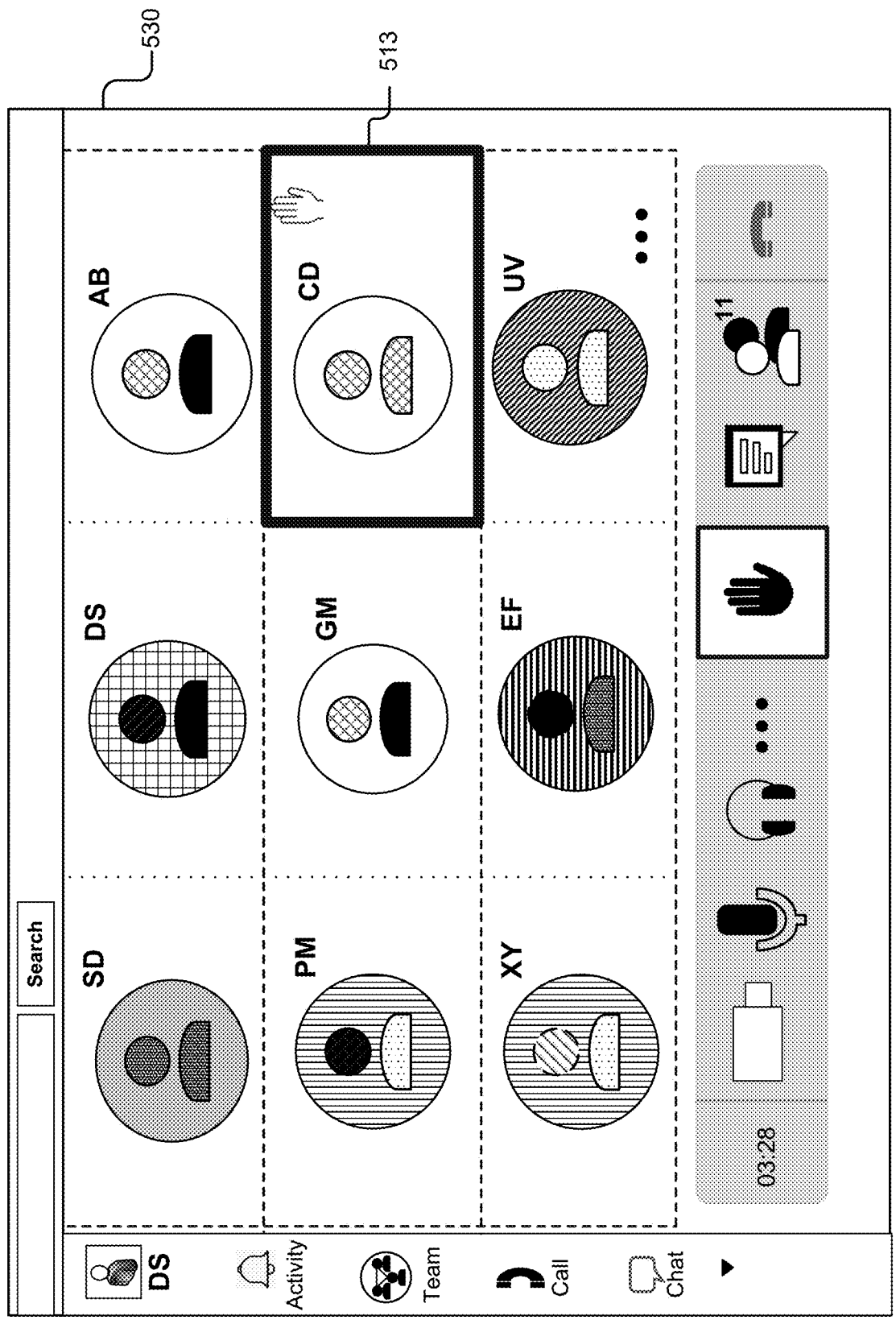
FIG. 5D illustrates an example graphical user interface showing a different persistent image.

FIG. 5D illustrates an example graphical user interface 530 showing a different persistent image. Instead of having a color different from other grids, the persistent image in grid 513 has a different frame. A person of ordinary skill in this art would realize there are many other ways to display a persistent image.

Figure 5E:
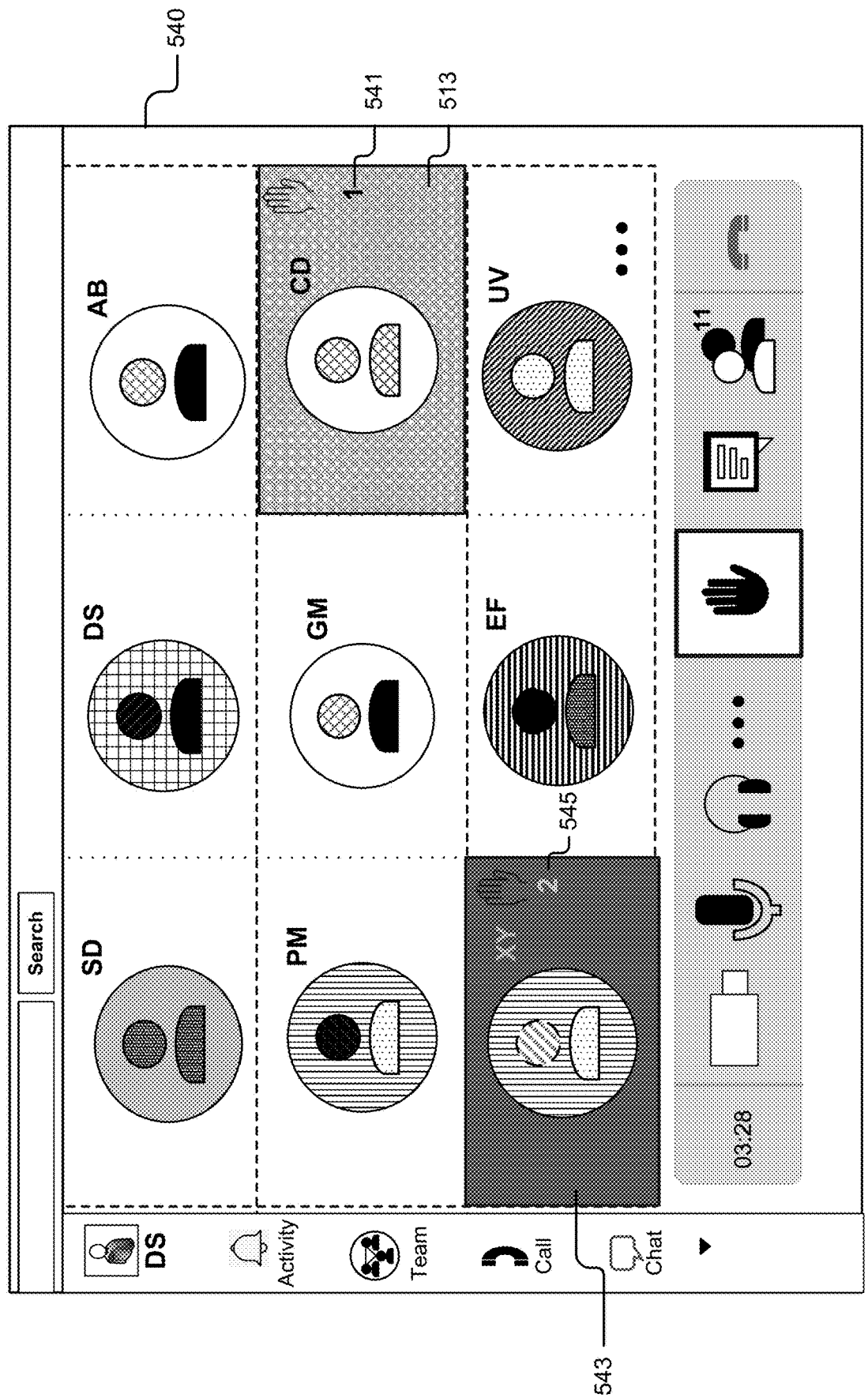
FIG. 5E illustrates an example graphical user interface showing two persistent images concurrently.
Figure 5F:
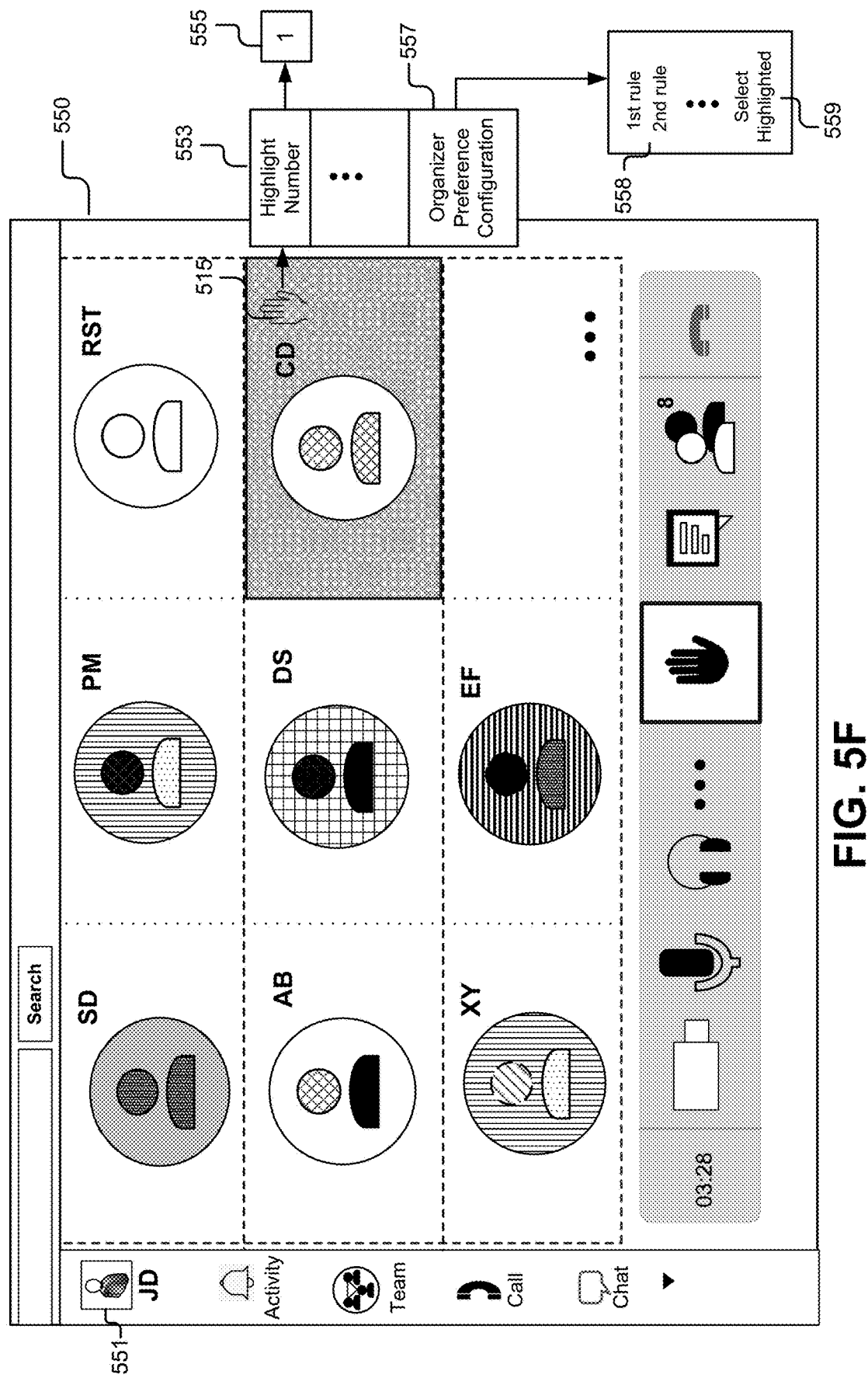
FIG. 5F illustrates an example graphical user interface showing a configuration interface presented to a meeting organizer.

FIG. 5E illustrates an example graphical user interface 540 showing two persistent images concurrently. A predetermined number of next speaker(s) can be identified responsive to multiple meeting participants raising hands to request to speak. When the number is one, only one user, CD, is identified as shown in FIGS. 5B-5D. When the number is changed to two as shown in this figure, another user XY is also identified. CD still has a persistent image in grid 513, but a number 1 is added to show that he/she will be the next speaker. The newly identified XY has a persistent image in grid 543, which includes number 2 in 543 to show that he/she would talk after CD.

FIG. 5F illustrates an example graphical user interface 550 showing a configuration interface presented to a meeting organizer JD in 551. As depicted, when JD selects the visual interruption symbol 515 included in the persistent image of the next speaker CD, a menu can be populated for JD to perform some configurations. For example, JD may select the "Highlight Number" option in 553 to set an integer value in 555. This value is the predetermined number that defines how many next speakers can be identified and displayed concurrently on the meeting interface. In FIG. 5B-5D, this value is one. In FIG. 5E, this value is two. The meeting organizer JD may also select "Organizer Preference Configuration" in 557 to set up organizer preferences or an organizer criterion. For example, JD can configure preferences using different rules as shown in 558, or choose a next speaker using the "Select Highlighted" option in 559. When options 558 and/or 559 are selected, other interface elements will show up to help JD to finish the configuration task.

Figure 5G:
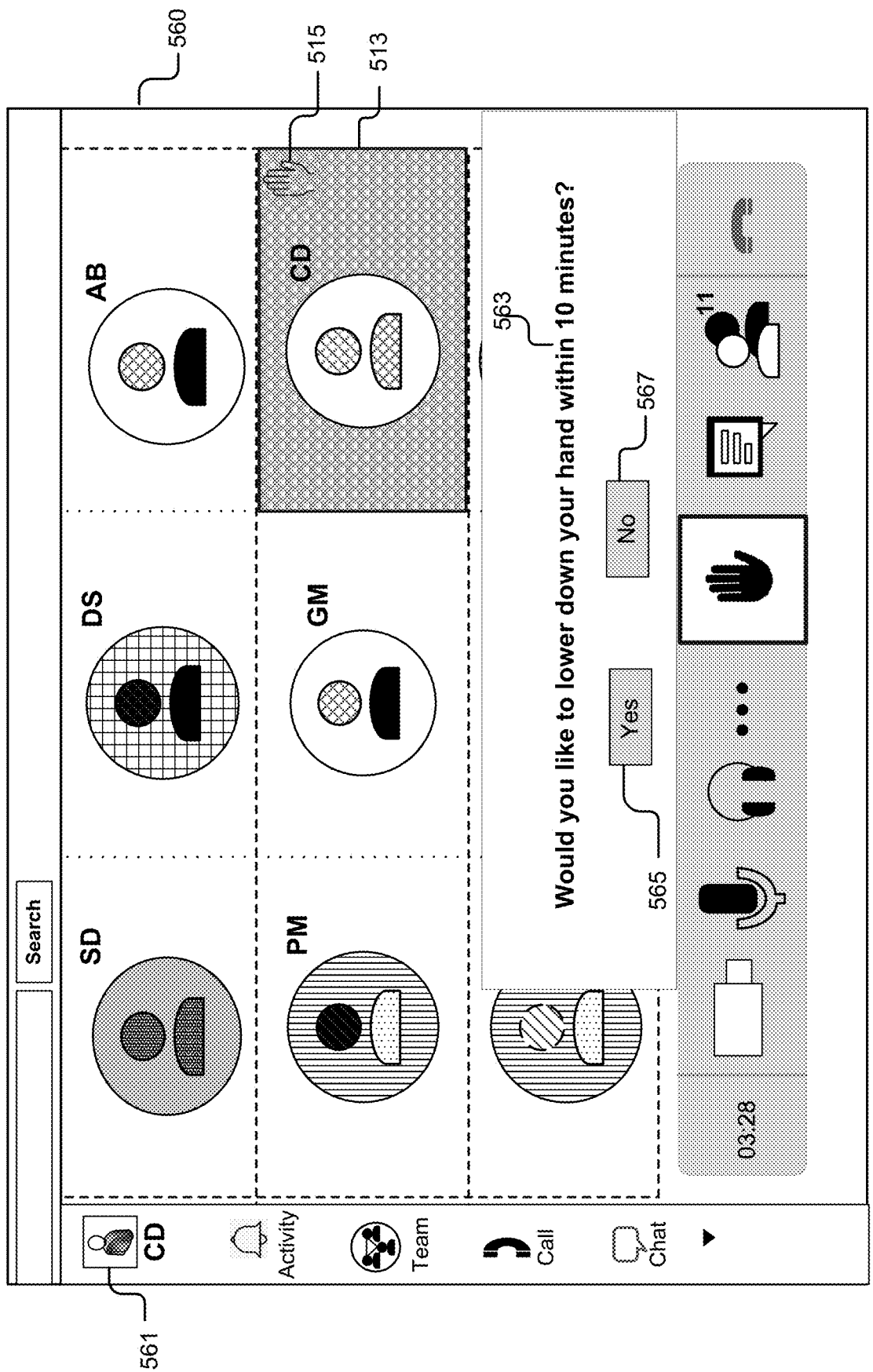
FIG. 5G is an example graphical user interface resulting from lowering a raised hand.

FIG. 5G illustrates an example graphical user interface 560 showing a lowering-hand notification. The user interface 560 is the meeting interface of participant CD at 561 after CD has talked in the meeting in response to his/her raising hand request. At this point, the persistent image 513 should be removed as CD is no longer a next speaker. To allow the speaker next in line to be identified and displayed, CD's visual interruption symbol or hand in 515 needs to be lowered down. However, if a threshold amount of time passed and the hand in 515 is still on, a reminder 563 will be generated and presented to CD. CD can choose "Yes" in 565 or "No" in 567 to determine whether to lower down the hand within 10 minutes. If not, the visual interruption symbol 515 will be automatically cleared.

Figure 6:
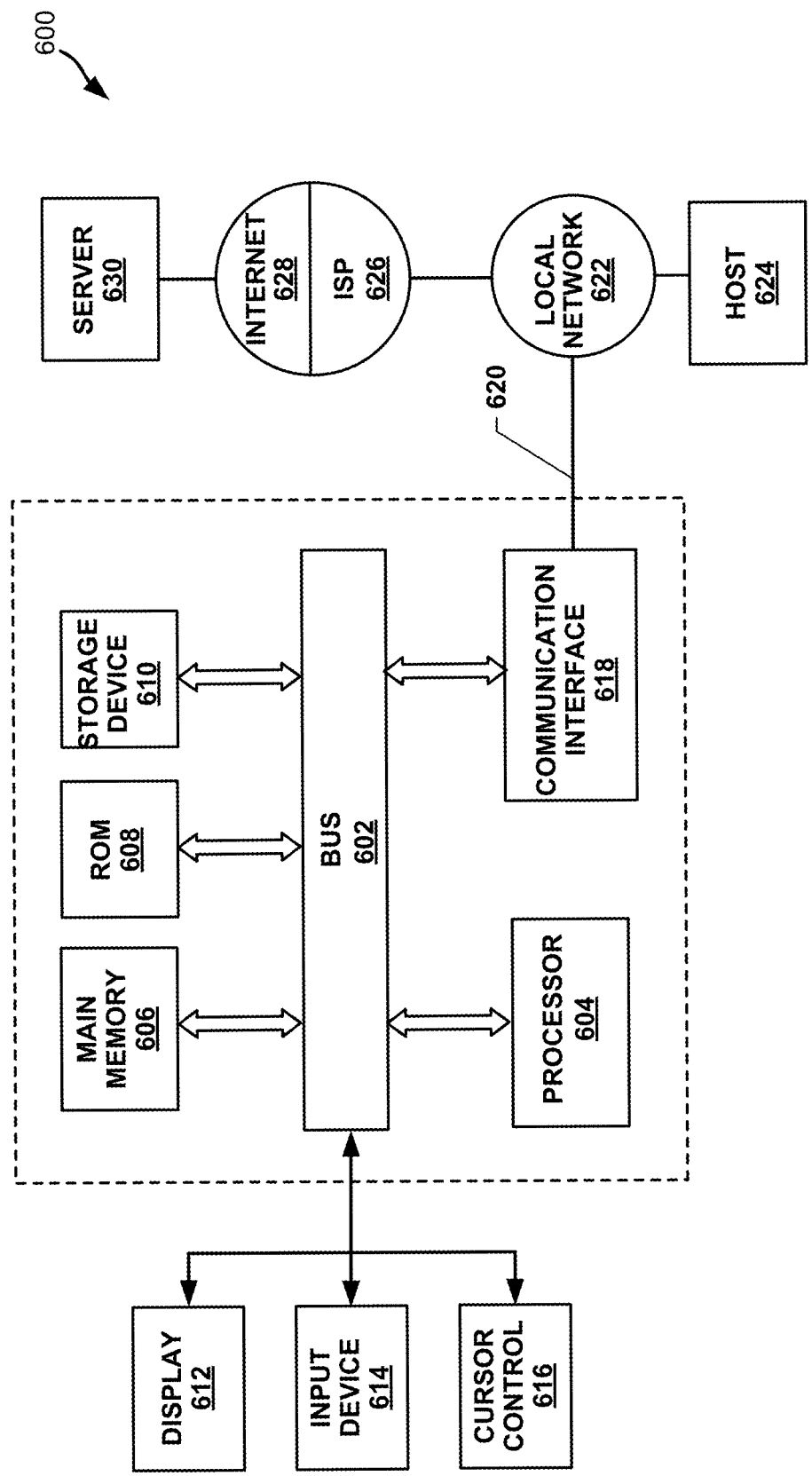
FIG. 6 is a functional block diagram of an example computer system upon which aspects of this disclosure may be implemented.

FIG. 6 is a functional block diagram of an example computer system 600 upon which aspects of this disclosure may be implemented. It will be understood that the logic blocks illustrated in FIG. 6 represent functions, and do not necessarily correspond to particular hardware on a one-to-one basis. The computer system 600 can include a data processor 604, coupled by a bus 602 to an instruction memory or main memory 606, a read-only memory 608, and a storage device 610. The instruction memory 606 can include a tangible medium retrievably storing computer-readable instructions, that when executed by the data processor 604 cause the processor to perform functions, processes, and operations described herein, for example, in reference to FIGS. 1-4.

The computer system 600 can also include a display 612, a user interface or other input device 614, and a cursor control 616, either as separate devices or combined, for example, as a touchscreen display. The computer system 600 can also include a communications interface 618, configured to interface with a local network 622 by a bus 620 for accessing a local host server 624, and to communicate through an ISP 626 to the Internet 628, and access a remote server 630.

Some implementations comprise a computer-readable storage media including executable instructions, that when executed on at least one processor, cause the processor to perform any of the above-described methods.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 106, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system for adapting meeting interfaces of an application providing a virtual meeting in response to receiving interruption signals, the system comprising:
   a processor; and
   a memory, coupled to the processor, configured to store executable instructions that, when executed by the processor, cause the processor to:

receive a plurality of interruption signals, from meeting interfaces of the application providing the virtual meeting, wherein the meeting interfaces are among a set of meeting interfaces associated with the application providing the virtual meeting on a respective set of client devices for a respective set of participants of the virtual meeting;

based on a criterion associated with the virtual meeting:
determine an order for surfacing the interruption signals on the meeting interfaces to identify a next speaker among the respective set of participants to be surfaced in the virtual meeting and an order of participants to follow as subsequent speakers after the next speaker among the respective set of participants to be surfaced in the virtual meeting; and identify, from the determined order for surfacing the interruption signals, a first subset of interruption signals associated with a first subset of participants, wherein the first subset of interruption signals includes one or more of the received interruption signals but less than a total number of the received interruption signals so that the first subset of interruption signals will include at least the identified next speaker and will not include all of the identified subsequent speakers;

responsive to identifying the first subset of interruption signals, send a first interruption symbol raising signal over a communication network to each meeting interface of the set of meeting interfaces, the first interruption symbol raising signal being configured to turn on a first subset of visual interruption symbols associated with the first subset of participants for displaying on each meeting interface, wherein the displayed first subset of visual interruption symbols includes one or more visual interruption symbols but less than a total number of the received interruption signals to display one of the visual interruption symbols for at least the next speaker but to suppress display of at least one of the visual interruption symbols for at least one of the subsequent speakers for which no interruption symbol lowering signal initiated by one of the respective set of participants has been received.

2. The system of claim 1, wherein to turn on the first subset of visual interruption symbols for displaying, the executable instructions further include instructions that, when executed by the processor, cause the processor to maintain a display of each of the first subset of visual interruption symbols along with a visual representation of a corresponding participant of the first subset of participants at a position of each meeting interface while changing displays of one or more visual representations of one or more other participants at one or more other positions of each meeting interface.

3. The system of claim 1, wherein the executable instructions further include instructions that, when executed by the processor, cause the processor to:
responsive to detecting an interruption symbol lowering signal to turn off one of the first subset of visual interruption symbols associated with one of the first subset of participants on each meeting interface:
update each meeting interface to turn off the one of the first subset of visual interruption symbols associated with the one of the first subset of participants;
subsequent to turning off the one of the first subset of visual interruption symbols, automatically identify a next interruption signal for surfacing from the plurality of interruption signals other than the first subset of interruption signals according to the determined order; and
send a next interruption symbol raising signal corresponding to the next interruption signal over the communication network to each meeting interface of the set of meeting interfaces to turn on a next visual interruption symbol associated with a next participant for displaying on each meeting interface.

4. The system of claim 1, wherein the criterion includes at least one of timestamps associated with the plurality of interruption signals, user roles associated with participants of the virtual meeting, relevancy of the participants to the virtual meeting, and organizer preferences.

5. The system of claim 4, wherein the executable instructions further include instructions that, when executed by the processor, cause the processor to:
queue the plurality of interruption signals based on the criterion; and
wherein identifying the subset of interruption signals or the next interruption signal is based on the queue of the plurality of interruption signals.

6. The system of claim 1, wherein:
the first subset of interruption signals includes a single interruption signal,
the first subset of participants includes a single participant sending the single interruption signal, and
the displayed first subset of interruption symbols includes a single interruption symbol associated with the single participant.

7. The system of claim 4, wherein to automatically identify the next interruption signal, the executable instructions further include instructions that, when executed by the processor, cause the processor to:
identify a second interruption signal and a third interruption signal from the plurality of interruption signals other than the first subset of interruption signals, wherein the second interruption signal is received earlier than the third interruption signals as indicated by the timestamps associated with the second and third interruption signals; and
identify the third interruption signal as the next interruption signal by overriding the timestamps associated with the second and third interruption signals based on the criterion.

8. The system of claim 7, wherein the executable instructions further include instructions that, when executed by the processor, cause the processor to:
identify an overridden second interruption signal as the next interruption signal before a threshold amount of time elapses.

9. The system of claim 3, wherein the interruption symbol lowering signal is received responsive to a user operation from at least one of the one of first subset of participants or a meeting organizer.

10. The system of claim 9, wherein the executable instructions further include instructions that, when executed by the processor, cause the processor to generate a prompt, via a first meeting interface, to notify the one of the first subset of participants to perform the user operation and activate the interruption symbol lowering signal.

11. The system of claim 3, wherein the interruption symbol lowering signal is automatically generated responsive to detecting an acoustic signal from the one of the first participants.

12. A method for adapting meeting interfaces of an application providing a virtual meeting in response to receiving interruption signals, the method comprising:
- receiving a plurality of interruption signals, from meeting interfaces of the application providing the virtual meeting, wherein the meeting interfaces are among a set of meeting interfaces associated with the application providing the virtual meeting on a respective set of client devices for a respective set of participants of the virtual meeting;
- based on a criterion associated with the virtual meeting:
  - determining an order for surfacing the interruption signals on the meeting interfaces to identify a next speaker among the respective set of participants to be surfaced in the virtual meeting and an order of participants to follow as subsequent speakers after the next speaker among the respective set of participants to be surfaced in the virtual meeting; and
  - identifying, from the determined order for surfacing the interruption signals, a first subset of interruption signals associated with a first subset of participants, wherein the first subset of interruption signals includes one or more of the received interruption signals but less than a total number of the received interruption signals so that the first subset of interruption signals will include at least the identified next speaker and will not include all of the identified subsequent speakers;
- responsive to identifying the first subset of interruption signals, sending a first interruption symbol raising signal over a communication network to each meeting interface of the set of meeting interfaces, the first interruption symbol raising signal being configured to turn on a first subset of visual interruption symbols associated with the first subset of participants for displaying on each meeting interface, wherein the displayed first subset of visual interruption symbols includes one or more visual interruption symbols but less than a total number of the received interruption signals to display one of the visual interruption symbols for at least the next speaker but to suppress display of at least one of the visual interruption symbols for at least one of the subsequent speakers for which no interruption symbol lowering signal initiated by one of the respective set of participants has been received.

13. The method of claim 12, wherein turning on the first subset of visual interruption symbols for displaying further comprises:
- maintaining a display of each of the first subset of visual interruption symbols along with a visual representation of a corresponding participant of the first subset of participants at a position of each meeting interface while changing displays of one or more visual representations of one or more other participants at one or more other positions of each meeting interface.

14. The method of claim 12, wherein turning on the first subset of visual interruption symbols for displaying further comprises:
- responsive to detecting an interruption symbol lowering signal to turn off one of the first subset of visual interruption symbols associated with one of the first subset of participants on each meeting interface:
  - updating each meeting interface to turn off the one of the first subset of visual interruption symbols associated with the one of the first subset of participants;
  - subsequent to turning off the one of the first subset of visual interruption symbols, automatically identifying a next interruption signal for surfacing from the plurality of interruption signals other than the first subset of interruption signals according to the determined order; and
  - sending a next interruption symbol raising signal corresponding to the next interruption signal over the communication network to each meeting interface of the set of meeting interfaces to turn on a next visual interruption symbol associated with a next participant for displaying on each meeting interface.

15. The method of claim 12, wherein the criterion includes at least one of timestamps associated with the plurality of interruption signals, user roles associated with participants of the virtual meeting, relevancy of the participants to the virtual meeting, and organizer preferences.

16. The method of claim 15, further comprising:
- queuing the plurality of interruption signals based on the criterion; and
- wherein identifying first subset of interruption signals or the next interruption signal is based on a queue of the plurality of interruption signals.

17. The method of claim 12, wherein:
the first subset of interruption signals includes a single interruption signal,
the first subset of participants includes a single participant sending the single interruption signal, and
the displayed first subset of interruption symbols includes a single interruption symbol associated with the single participant.

18. The method of claim 15, wherein automatically identifying the next interruption signal further comprises:
- identifying a second interruption signal and a third interruption signal from the plurality of interruption signals other than the first subset of interruption signals, wherein the second interruption signal is received earlier than the third interruption signals as indicated by the timestamps associated with the second and third interruption signals; and
- identifying the third interruption signal as the next interruption signal by overriding the timestamps associated with the second and third interruption signals based on the criterion.

19. The method of claim 18, further comprising identifying a overridden second interruption signal as the next interruption signal before a threshold amount of time elapses.

20. The method of claim 14, wherein the interruption symbol lowering signal is automatically generated responsive to detecting an acoustic signal from the one of the first participants.

* * * * *